Sept. 16, 1947. W. E. REARDON 2,427,509
PROCESS AND APPARATUS FOR THE MANUFACTURE OF CARBON BLACK
Filed Oct. 30, 1940 3 Sheets-Sheet 1

INVENTOR
WILLIAM E. REARDON, DEC'D.
BY ELIZABETH JANE REARDON
BY EXECUTRIX

Pennie, Davis, Marvin & Edmonds
ATTORNEYS

Sept. 16, 1947.  W. E. REARDON  2,427,509
PROCESS AND APPARATUS FOR THE MANUFACTURE OF CARBON BLACK
Filed Oct. 30, 1940  3 Sheets-Sheet 3

INVENTOR
WILLIAM E. REARDON, DEC'D.
BY ELIZABETH JANE REARDON
BY  EXECUTRIX

Annie Davis, Marvin Edmonds.
ATTORNEYS

Patented Sept. 16, 1947

UNITED STATES PATENT OFFICE 2,427,509

PROCESS AND APPARATUS FOR THE MANUFACTURE OF CARBON BLACK

William E. Reardon, deceased, late of Monroe, La., by Elizabeth Jane Reardon, executrix, Monroe, La., assignor to Columbian Carbon Company, New York, N. Y., a corporation of Delaware Application October 30, 1940, Serial No. 363,542

10 Claims. (Cl. 23—209.8)

This invention relates to the production of carbon black by what is generally known as the channel process. It relates more particularly to improved methods and apparatus for carrying out the channel process for the production of carbon black whereby the yield of high-grade carbon black per thousand cubic feet of hydrocarbon gas used is materially increased and the characteristics of the product are at all times under more complete control of the operator than has heretofore been possible.

The channel process is well known and widely used for the production of carbon black and the product thereof is of a particular type generally known as channel black. Briefly, the channel process consists of burning a hydrocarbon fuel, usually natural gas, with a supply of oxygen insufficient for complete combustion so as to produce a smokey flame. This smokey flame is caused to impinge upon a relatively cool metallic surface, such as the underside of a channel iron, which results in the deposition of the fine carbon particles upon such surfaces. These surfaces, with the carbon deposited thereon, are periodically moved away from the flame so that the carbon black may be scraped therefrom and fresh surfaces exposed to the impingement of the flame. The carbon black scraped from the surface is dropped into hoppers and from thence is carried away by means of conventional conveyors.

The advantages of the channel process are well known to those familiar with the art. The product has certain very desirable characteristics, indispensable to the various industries by which it is used, such as intense blackness, high tinting strength, extreme fine state of subdivision, length of flow and the like which are not obtainable by other processes.

However, from a practical commercial standpoint, the channel process, as heretofore practiced, has several serious handicaps. Perhaps one of the most serious objections, certainly very serious from the standpoint of conservation of natural resources, is the low yield. As normally practiced, only about .85 of a pound of carbon black is recovered from 1000 cubic feet of natural gas used, which is in the neighborhood of 4% or less of the theoretical amount of carbon present in the gas.

Further objections to this type of operation are the pollution of the atmosphere of the surrounding countryside with clouds of smoke, consisting of unrecovered fine carbon particles, and the extreme difficulty experienced in maintaining the characteristics of the product uniform.

In spite of the seriousness of these objections, the industry had accepted these disadvantages as inevitable and continued to use the process because it was the only known means of producing a carbon black having the specific characteristics so essential to a satisfactory product for certain purposes.

By the use of the present invention one is enabled to increase the yield by as much as 50% or more without adversely affecting the characteristics of the product. To the contrary, the characteristics of the product of this improved process may be readily controlled by the operator and, without sacrificing yield, a product of decidedly blacker color and greater tinting strength may be obtained. Further, the invention enables one to eliminate the smoke nuisance and to recover certain by-products which has heretofore been impractical, if not impossible, and to produce consistently a uniform product by maintaining uniform operating conditions independently of fluctuating general atmospheric conditions.

For a full appreciation of this invention it is necessary to consider the practical application of the prior knowledge of the art. Heretofore, the channel process has been carried out in rectangular sheet iron or like metal buildings of considerable size, known as burner houses. In the upper portion of these burner houses, row after row of gas jets or burners are arranged beneath a plurality of channel irons. These houses also contain machinery for moving the channels back and forth, for scraping the carbon from the channels and for collecting the carbon black product in the well known manner. Air for supporting the incomplete combustion of the natural gas has been invariably supplied through openings positioned in the lower outer walls of the building. The only control of the atmospheric conditions in the flame zone has been the rough control of the amount of air admitted to the entire building, air being admitted in such amounts as will maintain what is generally termed the "smoke blanket" in the building at some predetermined level and produce some predetermined flame color. Such control as has existed is only an approximation and is often ineffectual. There has been no positive control of atmospheric conditions in the zone of reaction.

The characteristics of the carbon black product of the channel process vary over a considerable range depending upon relatively minor variations in the process. Certain of the characteristics of the product appear to vary in relation to absorbed gases such as oxides of carbon, nitrogen, etc., and to depend upon the environment to which the product has been subjected during its formation and deposition and immediately subsequent to deposition. Characteristics of the product vary with the amount of oxygen, nitrogen and oxides of carbon present in the immediate vicinity of the flame. The industry has until now relied upon the general control of conditions within the burner house to impart certain desired characteristics to the carbon black product but it has been unable to effect a control of conditions in the immediate vicinity of the flame which was more than an approximation.

In the channel process as previously carried out it has been necessary to admit to the burner house extremely large quantities of air in order to obtain a carbon black product having the desired characteristics. Normally the volume of air so introduced has been 80 to 100 times the volume of natural gas used and frequently even greater. The greater part of the air has passed out of the burner house without coming into the immediate vicinity of the flame but it has carried with it large quantities of heat. This heat is absorbed from the combustion or flame zone and is carried off and dissipated into the atmosphere, thus being wasted. This loss of heat materially decreases the yield.

Numerous attempts have been made in the past to avoid the loss of heat from the channel process and to effect a conservation of the natural gas consumed but all such previous attempts have resulted in conditions which adversely affected the reaction or decomposition and resulted in a product of inferior quality resembling lampblack.

Not only is the excessive amount of air unnecessary to the production of a carbon black of the desired characteristics, as it has generally been considered to be until now, but it is an actual detriment. Not only does it carry away tremendous amounts of heat necessitating the consumption of excessive amounts of fuel buit it is in part responsible for cross-drafts and turbulence within the burner house which causes fluctuating and non-uniform atmospheric conditions within the flame zone. These fluctuations are influenced by temperature, wind and general atmospheric conditions outside of the burner house and also by variations in the amount of air admitted to the burner house.

Though conditions within the burner house have been controlled to a degree to give generally satisfactory products, it will be noted that the product is collected from all of the burners in the house. When all of these burners are not operating under uniform conditions, the product is bound to consist of carbon black particles of non-uniform characteristics and represents what is in effect an average product. Consequently, it has previously been impractical, if not impossible, in commercial scale operation, to obtain a product which possessed the desired characteristics to the fullest degree.

In accordance with this invention, the zone of carbon formation and deposition is separated from other portions of the burner house so as to exclude all air therefrom except that introduced in uniformly regulated amounts directly into the burner zone. Such air is preferably introduced in uniformly controlled separate streams directly to the immediate vicinity of the individual burners.

Further, it is particularly advantageous substantially to isolate each individual flame zone or a group of individual flame zones by more or less surrounding it by means of refractory baffles or the like so that the heat generated by the flame is largely reflected by the baffle and retained in the zone of combustion or decomposition. Such baffles may be so shaped and positioned as to extend along either side of a row of burners, thus effectively shielding the flame zone on the two opposite sides only. However, it is preferable completely to surround each individual flame zone by baffles and to supply the desired quantity of air separately to the individual isolated flame zones, as more fully described hereinafter.

By thus uniformly supplying to each flame zone a predetermined optimum quantity of air to produce the maximum yield of carbon black product having the desired characteristics and excluding air from all other sources, and by reducing radiation losses, in accordance with this invention, the necessary amount of air admitted to the burner house is reduced from the customary 80 to 100 volumes or more per volume of hydrocarbon gas consumed to approximately one-tenth of that amount. This reduction in the quantity of air admitted to the burner house materially decreases the heat loss and also results in a correspondingly reduced volume of gases passing from the burner house.

The gases passing from the burner house customarily carry large quantities of minute carbon particles and appear as dense black smoke. Frequently an amount of carbon black as high as 10% of the amount recovered in the ordinary manner is thus carried away and distributed over the countryside. This carbon black now being carried out of the burner house by the effluent gases is recoverable by conventional recovery means but, because of the large volumes of such gases which would have to be handled according to prior methods, such recovery has been impractical. Further, these effluent gases contain valuable quantities of carbon dioxide which it has been impractical to recover because of its dilution with excessive quantities of air.

By the reduction of the amount of air admitted to the burner houses, in accordance with the present invention, the volume of effluent gases is proportionately reduced and the recovery of carbon black and of carbon dioxide from the more concentrated effluent gases becomes both practical and profitable.

Further, by reason of the excessive amounts of air customarily admitted to the burner houses, the temperature of the effluent gases has not been sufficiently high to warrant the recovery of the tremendous amounts of heat carried off thereby. In carrying out the process of the present invention, the temperature of these effluent gases is much higher, frequently 100 to 200° F. higher than the temperature of the effluent gases from the conventional channel process and, in accordance with the present invention, it is desirable to utilize this heat to preheat the air supplied to the combustion zones, thus effecting further conservation of heat and making the conditions within the flame zone more stable with respect to general atmospheric fluctuations outside of the burner houses. Because of their relatively high temperature, these effluent gases may also be used for other purposes where moderate heating is required.

Other features and advantages of the present invention will appear from the following more detailed description of the process with reference to apparatus particularly adapted to the carrying out of the process.

In the accompanying drawings.

Like reference numerals indicate corresponding parts in the several figures of drawings.

Figure 1:
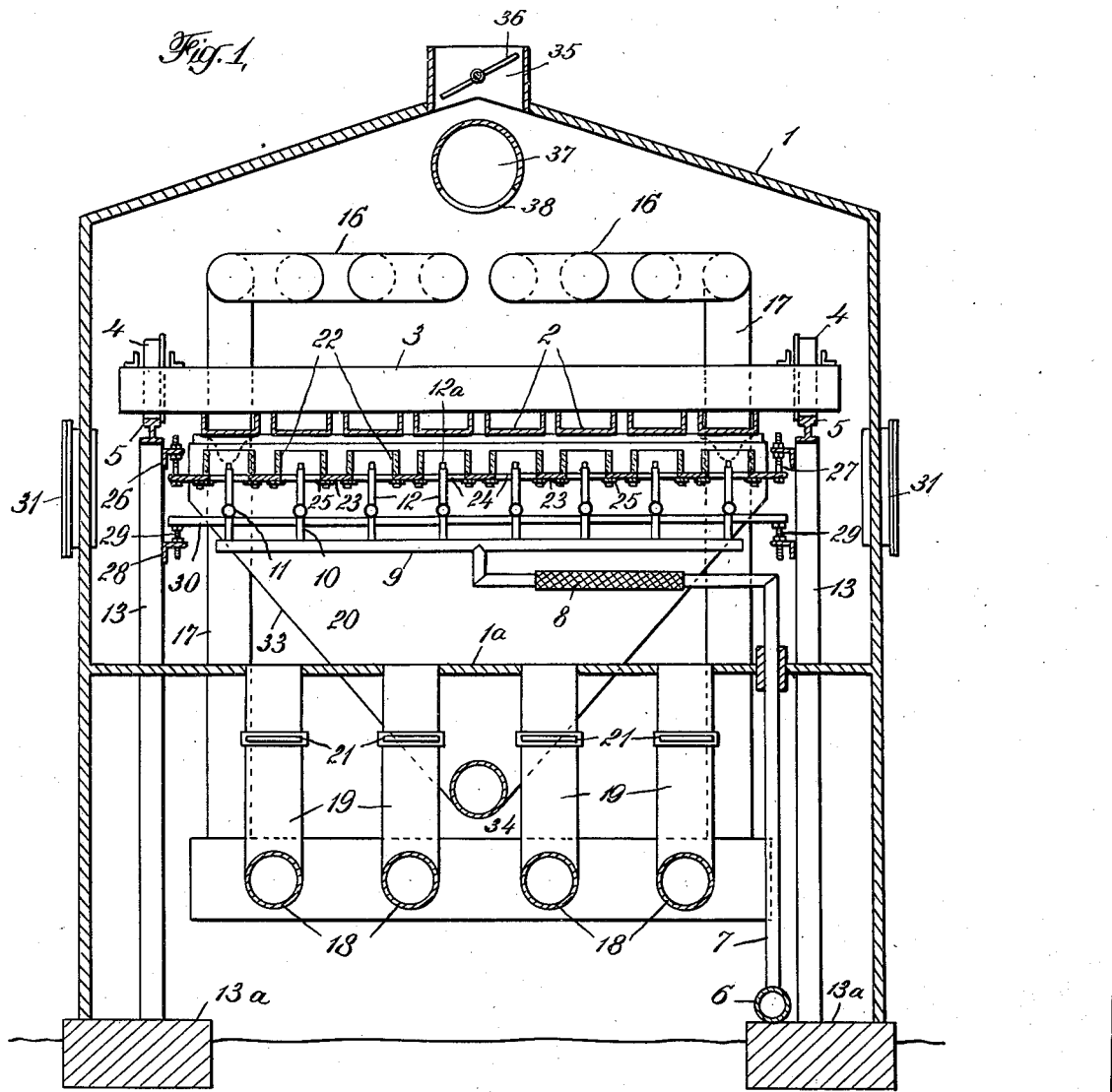
Fig. 1 represents a cross-sectional end view of a conventional burner house, modified in accordance with the present invention.
Figure 2:
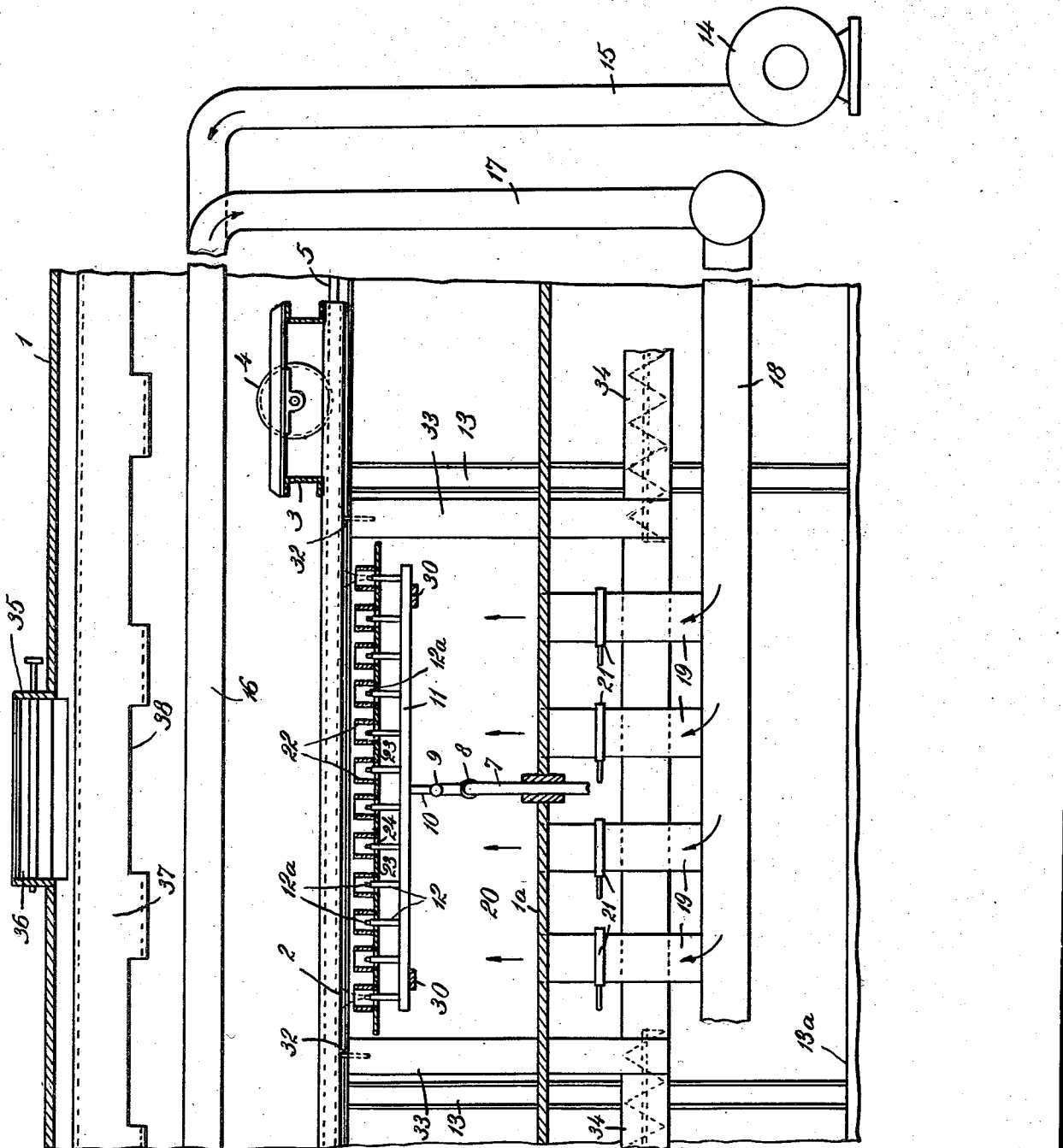
Fig. 2 is a fragmentary cross-sectional side-view of the intermediate section of such modified burner house.

In Figs. 1 and 2 the burner house is represented by the numeral 1 and is of metal or other heat-resistant material. The burning zone, wherein the gas is burned and the carbon black deposited, is separated from the lower portion of the burner house by the partition 1a which may be of similar material. The channels 2, which may be of any desired number, are supported by the carriage 3, adapted to be moved back and forth in the conventional manner on the wheels 4 over the tracks 5 held by the supports 13. These supports rest on a footing 13a shown as an integral part of the foundation of the house. The run gas is supplied by the main 6 to the pipe 7 which leads through the flexible connection 8 to the header 9. This header 9 is connected by a plurality of pipes 10 to the burner pipes 11 to which the several rows of burners 12 are directly connected and by which they are supported.

By means of blower 14, or other conventional means, air for supporting the partial combustion of the run gas is forced in a controlled amount by way of the conduit 15, through a plurality of air preheaters 16, located in the upper portion of the burner house 1 so that hot gases leaving the burning zone come in contact therewith. These air preheaters may be of any convenient type and should have sufficient heat exchange surface so that the air passing therethrough will be heated to the desired temperature, as is well understood in the art of air preheater design. In the drawings, the preheaters are shown as consisting merely of a plurality of lengths of metal pipe connected by return bends. The preheated air passes from the preheaters 16 downwardly through conduits 17 to the headers 18 from which it passes through a plurality of conduits 19 which lead through openings in the partition 1a into the burning zone 20, from which it passes to separate flame zones, hereinafter described, in uniform and substantially equal amounts.

It is desirable, particularly in large apparatus, to introduce the preheated air to the burning zone through a plurality of inlet conduits such as shown in the drawings at 19 so as to distribute the incoming air uniformly throughout the zone and avoid strong localized air currents. Further, where the air headers are relatively long, it is advantageous to place dampers in the conduits 19 as shown at 21 by means of which a more even distribution of air throughout the zone 20 may be effected.

The burners 12 are equipped with conventional type burner tips 12a and in Figs. 1 and 2 each individual burner is shown entirely surrounded by baffles or shields 22 so that the flame from each burner is in a separate flame zone. These shields are advantageously made of refractory material such as firebrick. The baffles rest upon and are supported by a horizontally-extending sheet of heat-resistant material 23 suitably reinforced and provided with perforations or air openings 24 through which the burners project. The sheet 23 functions as an impervious barrier to prevent the upward passage of air between the respective flame zones. The size of the openings may be varied by means of slides indicated on Fig. 1 by the numeral 25.

The perforated sheet 23 is supported by means of brackets 26 and the height of the baffles with respect to the burner tips may be varied by raising or lowering the perforated sheet by means of the supporting bolts 27. The burner pipes 11 are supported by a rigid member 30 which is in turn supported by brackets 28 and the distance between the burner tips and the lower channel surfaces may be adjusted by means of the supporting bolts 29. Access to the burning zone for making such adjustments or for other purposes may be had by way of manholes 31 which are adapted to be tightly closed when the apparatus is in operation.

In the operation of this apparatus, gas is burned from the burner tips 12a surmounting burners 12 and the flame impinges upon the channels 2 depositing carbon black thereon. In order to remove the black so deposited, the channels are moved back and forth over scrapers indicated on Fig. 2 of the drawings by the numeral 32. The carbon black thus scraped from the channels drops into hoppers 33 through which it passes to conveyors 34 which remove the black to storage or other processing operations.

The hot products of combustion pass upwardly from the burning zone over the preheaters 16 in the upper part of the burner house from whence they may pass off into the atmosphere through the gas exit 35 provided with damper 36. However, I prefer to collect these hot carbon-laden gases by means of conduit 37 provided with inlet ports 38 for the recovery of suspended carbon black, carbon dioxide gas and further recoverable heat by means of conventional apparatus which need not be described herein.

Figure 3:
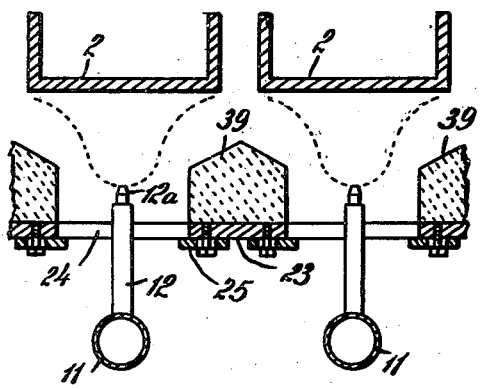
Fig. 3 is a fragmentary cross-sectional end-view showing one modification of baffle arrangement.
Figure 4:
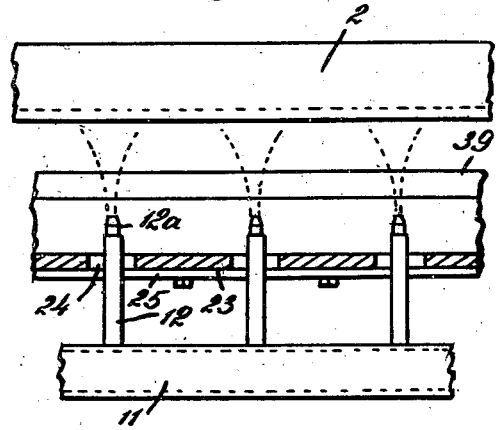
Fig. 4 is a fragmentary cross-sectional side-view of Fig. 3.

Figs. 3 and 4 show a modified baffle arrangement according to which the individual burners are not completely surrounded but the rows of burners are separated and effectively shielded by means of baffles 39 extending the entire length of the burner rows so as to diminish cross-drafts and heat-radiation losses. In the drawing these baffles are shown as tapering toward their upper edge. This arrangement is desirable particularly where the channels are close together as it allows the air to stream upwardly past the flame with less tendency toward turbulence and flame deformation.

Figure 5:
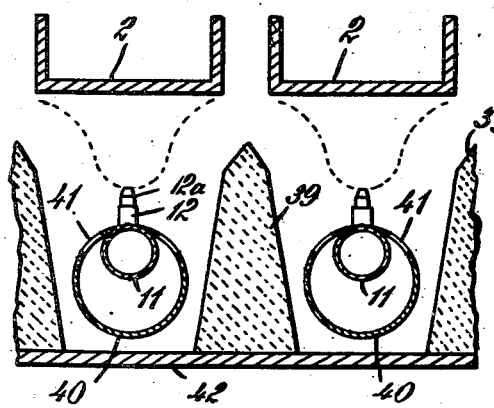
Fig. 5 is a fragmentary cross-sectional end-view illustrating a further modification of the invention.
Figure 6:
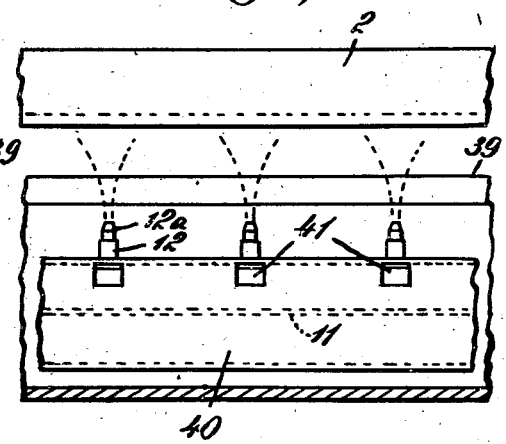
Fig. 6 is a fragmentary cross-sectional side-view of Fig. 5.

Figs. 5 and 6 show a still further modification of the present invention. The arrangement of baffles 39 is similar to that of Figs. 3 and 4 but this modification comprises a unique and highly desirable manner of supplying the air and run gas to the burners. According to this modification, the burner pipe 11 is located within the baffled zone and is surrounded by the air conduit 40 provided with air ports 41 positioned along its length on each side of the individual burners. By this arrangement the burning zone is further restricted and is sealed off from the lower portion of the burner house by the impervious heat-resistant sheet 42. By this arrangement, the incoming air is preheated and also serves to prevent overheating of the hydrocarbon gas passing through the pipes 11.

The yield, and also the characteristics of the product of this improved process, appears to vary somewhat with the air-gas ratio, the characteristics of the hydrocarbon gas being used and the size, shape and relative location of the baffles, i. e. the size and shape of the enclosed area surrounding the individual burners or flame zones.

The optimum air-gas ratio also appears to vary somewhat with the type of burner tip used and the size and type of baffle employed. The optimum air-gas ratio may be readily determined for any particular operating conditions when the principles of the invention, as herein fully disclosed, are understood.

To more fully exemplify the principles and advantages of the present invention, the following statements of specific details of apparatus and operating conditions are presented:

For purposes of comparison, an ordinary burner house, such as customarily used commercially, was equipped with means for measuring the quantity of air admitted thereto. The burners of this house were equipped with standard slotted tips, the slot being .034" wide and .2" deep. Under normal operating conditions, it was found that the air-gas ratio was 80 to 1 and the average yield was .85 pound of carbon black per thousand cubic feet of Louisiana natural gas used. For comparing blackness and tinting strength, a standard was selected, referred to herein as "Standard A," and compared therewith the channel black from this conventional burner house had a blackness of +3, i. e. three shades blacker than the standard and an equal tinting strength. Its volatile content was 4.55% and its adsorptive capacity for diphenyl-guanidine was 7.6%, as determined by methods commonly used in the testing of carbon black.

Further to demonstrate the present invention, and particularly to illustrate the way in which the optimum air-gas ratio varies with different apparatus, a semi-commercial size burner house was constructed. When equipped in the customary manner, it was found that the optimum air-gas ratio was 60 to 1 and that the average yield was .82 pound of carbon black per thousand cubic feet of Louisiana natural gas used. This semi-commercial size burner house was then equipped substantially as shown in Figures 1 and 2 of the drawing so that all air was excluded from the flame zone except that admitted in uniformly regulated amounts to the immediate vicinity of the individual flame zone, in accordance with the present invention. Baffles or shields of various sizes and shapes and variously arranged were employed and the air-gas ratios were varied. The results of these experiments appear from the following specific examples:

*Example 1*

Figure 7:
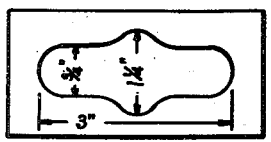
Fig. 7 is a plan view of a special form of baffle hereinafter discussed.

In this series of tests standard .034" slotted burner tips were used and so positioned that the top of the tip was 2¼" below the channel. Each burner was completely surrounded by a baffle or shield made from firebrick of the size and shape indicated by Fig. 7 of the drawings. The height of each baffle was 2". Air for combustion preheated to 170° F. was introduced into the shielded enclosure surrounding the individual burners in measured amounts. Natural gas was supplied to the burners at the rate of 2.7 cubic feet per hour per burner. With the above conditions maintained constant, the air-gas ratio was varied and the yield noted as indicated below:

| Air-Gas Ratio | Yield (pounds per 1,000 cubic feet of gas) |
|---|---|
| 8.9 | .97 |
| 12.4 | 1.06 |
| 13.5 | 1.08 |
| 14.3 | 1.075 |
| 16.9 | .985 |
| 18.0 | .915 |

The carbon black produced during these tests, when the air-gas ratio was 14.3 and the yield 1.075 pounds per thousand cubic feet of natural gas, was substantially identical in color, tinting strength, volatile content and adsorptive capacity for diphenylguanidine with the black produced in the ordinary burner house previously referred to where the yield was only .85 pound per thousand cubic feet of natural gas.

*Example 2*

In this series of tests each burner was surrounded by a baffle ¾" high and so arranged as to enclose an area 1" x 4" in which the burner was centrally located. Other conditions were maintained, as indicated under Example 1, and the air-gas ratio was varied, with the following results:

| Air-Gas Ratio | Yield (pounds per 1,000 cubic feet of gas) |
|---|---|
| 7.0 | .92 |
| 9.5 | 1.21 |
| 10.3 | 1.15 |

The carbon black produced during the above test, when the air-gas ratio was 9.5 and the yield 1.21 pounds per thousand cubic feet of natural gas, was about eight shades lighter than Standard A, had a tinting strength equal to 94% of Standard A, a volatile content of 4.02% and an adsorptive capacity for diphenylguanidine of 6.1%.

*Example 3*

In this series of tests, conditions and apparatus were the same as indicated under Example 2, except that the height of the shield, as well as the air-gas ratio, was varied as indicated, with the following results.

Using shield 1½" high:

| Air-Gas Ratio | Yield (pounds per 1,000 cubic feet of gas) |
|---|---|
| 8.3 | .78 |
| 9.9 | .98 |
| 12.1 | 1.11 |
| 14.4 | 1.09 |
| 16.9 | .98 |
| 19.1 | .85 |

Using shield 2" high:

| Air-Gas Ratio | Yield (pounds per 1,000 cubic feet of gas) |
|---|---|
| 8.0 | .8 |
| 10.1 | 1.04 |
| 12.1 | 1.18 |
| 13.8 | 1.15 |
| 16.7 | .92 |

The carbon black produced during the above test, where the 1½" high shield was used with an air-gas ratio of 14.4, was at least ten shades darker than the Standard A, had a tinting strength of 108% that of Standard A and an adsorptive capacity for diphenylguanidine of 7.6%. The carbon black produced by the 2" high shield and a 13.8 air-gas ratio had a color and tinting strength substantially identical with that of the carbon black last referred to.

*Example 4*

A series of tests were made in which conditions were maintained substantially as indicated under Example 1 except for the size and shape of the shields. These shields enclosed a diamond-shaped area surrounding the burner 1" wide and 3" long. With this arrangement, an average yield 1.262 pounds of carbon black per thousand cubic feet of gas was obtained, with an air-gas ratio of 12.5 to 1. The tinting strength of this product was equal to that of Standard A and its color was considerably blacker.

*Example 5*

This experiment was conducted primarily to illustrate the effect of the size of the burner tip on the optimum air-gas ratio. In these tests larger tips were used, the width of the slot being 0.15". The top of the tip was spaced 2½" from the channel surface. The shields were 2" high and were constructed of firebrick enclosing an area surrounding each burner 1¼" wide and 3" long in which the burner was centrally located. With other conditions maintained constant, the air-gas ratio was varied with the following results:

| Air-Gas Ratio | Yield (pounds per 1,000 cubic feet of gas) |
| --- | --- |
| 7.84 | .98 |
| 9.62 | 1.13 |
| 9.86 | 1.2 |
| 9.89 | 1.27 |
| 10.01 | 1.21 |
| 10.48 | 1.19 |
| 11.32 | 1.16 |

In this series of tests the yield was substantially equal for air-gas ratios of 9.62 and 11.32. However, the carbon black produced with the air-gas ratio of 9.62 was about eight shades lighter in color than Standard A while that produced with an air-gas ratio of 11.32 was about three shades darker than Standard A.

From the above specific examples it appears that the optimum air-gas ratio varies somewhat with the size and shape of the shielded area surrounding the flame, the height of the shields and also the size of burner tip used. Materially improved yields have been obtained in carrying out the process of the present invention in various types of apparatus by the use of air-gas ratios varying from approximately 6 to 1 to approximately 20 to 1. If the air-gas ratio is reduced much below about 6 to 1 or in some apparatus below a still higher figure, the hydrocarbon gas does not burn properly and considerable quantities of hydrocarbon gas pass off with the effluent gases from the burner house, thus lowering the yield. This condition is readily determined by analysis of the effluent gases. On the other hand, if the air-gas ratio substantially exceeds about 20 to 1 or, under some conditions, even exceeds a still lower figure, the yield decreases materially.

It will be understood that the air-gas ratios herein specified are determined at approximately normal atmospheric temperatures and pressures and, further, that they represent the ratios of the volume of air admitted to the burner zone to the volume of natural gas passed to the burners.

The characteristics of the product as to blackness, tinting strength, volatile content, adsorptive capacity for diphenylguanidine and the like also vary somewhat with air-gas ratios and other variables mentioned herein. However, in each of the above examples the product was at least equal to and in most instances superior to ordinary channel black.

In the channel process, there appears to be within the flame a core of hydrocarbon gas protected from the oxygen of the surrounding atmosphere by an envelope or flame. This core appears much darker than the surrounding flame. It is believed that it is within this inner core of the flame that decomposition as distinguished from combustion occurs resulting in the production of carbon black. This decomposition of the hydrocarbon gas is probably effected by the heat resulting from the combustion of the gases occurring in the outer portion of the flame. By diminishing heat losses from the flame area, through radiation, the amount of gas which must be burned to supply the heat necessary to effect the decomposition of the remaining portion of the hydrocarbon gas is materially reduced.

It is to be understood that this invention is in no way dependent upon the above suggested theory though such theory does appear to be supported by observed conditions.

In carrying out the invention it is highly desirable that the flame structure be disturbed as little as possible so that the inner core will remain at all times surrounded by the enveloping flame and thus protected from the oxygen of the adjacent atmosphere. In accordance herewith, special precautions are taken as described herein to maintain the flame in a quiescent condition by introducing the necessary air in such a way that it streams upwardly past the flames without appreciable turbulence and by preventing cross-drafts which would cause the flame to flicker and bring about undesirable diffusion of oxygen into the core of the flame.

Though the present invention has been described herein as applied to the channel process for producing carbon black, it will be appreciated from the foregoing disclosure that it is applicable to impingement processes generally whether the impingement surface be a channel, disc or drum.

What is claimed is:

1. An impingement process for producing carbon black which comprises incompletely burning fuel within a substantially closed chamber as a plurality of separate flames in separate flame zones separated by horizontally-extending impervious barriers which prevent the upward passage of air between the respective flame zones, protecting said flame zones from horizontal infiltration of gaseous media and from cross-drafts, causing the resulting flames to impinge upon carbon collecting surfaces within said chamber, supplying a regulated quantity of air to the lower portion of the chamber at a point below the flame zones, passing said air upwardly to the respective flame zones at a point below the base of the flame in uniform and substantially equal amounts to the respective flame zones, and restricting the amount of air thus supplied to that sufficient to support partial combustion of the gaseous fuel and so that it does not exceed about 20 volumes for each volume of gaseous fuel.

2. An impingement process for producing carbon black which comprises incompletely burning fuel within a substantially closed chamber as a plurality of separate flames in separate flame zones separated by horizontally-extending impervious barriers which prevent the upward passage of air between the respective flame zones, protecting said flame zones from horizontal infiltration of gaseous media and from cross-drafts, causing the resulting flames to impinge upon carbon collecting surfaces within said chamber, supplying a regulated quantity of air to the lower portion of the chamber at a point below the flame zones, passing said air upwardly to the respective flame zones at a point below the base of the flame in uniform and substantially equal amounts to the respective flame zones, so that the air flows upwardly past the respective flames without appreciable turbulence, and restricting the amount of air thus supplied to that sufficient to support partial combustion of the gaseous fuel and so that the amount supplied is between about 6 and 20 volumes for each volume of gaseous fuel.

3. An impingement process for producing carbon black which comprises incompletely burning a gaseous fuel within a substantially closed chamber as a plurality of separate flames in separate flame zones separated by horizontally-extending impervious barriers which prevent the upward passage of air between the respective flame zones, protecting said flame zones from horizontal infiltration of gaseous media and from cross-drafts, causing the resultant flames to impinge upon carbon collecting surfaces within said chamber, preheating air by heat exchange with hot gaseous products of the partial combustion, supplying a regulated quantity of the preheated air to the lower portion of the chamber at a point below the flame zones, passing said preheated air upwardly to the respective flame zones at a point below the base of the flame in uniform and substantially equal amounts to the respective flame zones so that the air flows upwardly past the flames without appreciable turbulence, and restricting the amount of air thus supplied to that sufficient to support partial combustion of the gaseous fuel and so that it does not exceed about 20 volumes for each volume of gaseous fuel.

4. An impingement process for producing carbon black which comprises incompletely burning a gaseous fuel within a substantially closed chamber as a plurality of separate flames in isolated flame zones separated by horizontally-extending impervious barriers which prevent the upward passage of air between the respective flame zones, the tops of the flames being directed against solid carbon collecting surfaces for the deposit of the carbon on said surfaces, directing substantially all of the air supplied for the flames to them in a direction substantially parallel to the direction of the flames, without directing any portion of the air toward the axis of the flames so as to cause it to impinge on the flames, by passing said air between spaced, substantially parallel shields extending substantially vertically from a point substantially below the bases of the respective flames to a point substantially above the bases of the respective flames, but not to the collecting surfaces, while maintaining the flames of such size and shape that contact of the flames with the shields or alteration of the normal shape of the flames is avoided prior to impingement of the tops thereof on the carbon collecting surfaces, supplying a regulated quantity of air to the lower portion of the chamber at a point below the flame zones, passing said air upwardly to the respective flame zones in uniform and substantially equal amounts to the respective flame zones, and restricting the amount of air thus suppplied to that sufficient to support partial combustion of the gaseous fuel and so that it does not exceed about 20 volumes for each volume of gaseous fuel.

5. In apparatus for producing carbon black by the impingement process comprising an enclosed chamber having an air-inlet at its lower end, an outlet for gaseous products of combustion at its upper end and enclosing in a zone thereof intermediate said inlet and outlet, a plurality of spaced gas burners and a relatively flat metallic surface so positioned above the burners as to constitute a carbon-collecting surface against which the flames from the burners impinge, the improvement which comprises a horizontally disposed partition positioned in the enclosed chamber at a height intermediate the lower and upper ends of the burners, said partition having perforations through which the respective burners project, said perforations being larger than the burners to permit the upward passage of air therethrough immediately surrounding the respective burners, said partition otherwise being substantially impervious to air.

6. In apparatus for producing carbon black by the impingement process comprising an enclosed chamber having an air-inlet at its lower end, an outlet for gaseous products of combustion at its upper end and enclosing, in a zone thereof intermediate said inlet and outlet, a plurality of spaced gas burners and a relatively flat metallic surface so positioned above the burners as to constitute a carbon-collecting surface against which the flames from the burners impinge, the improvement which comprises a horizontally disposed partition positioned in the enclosed chamber at a height intermediate the lower and upper ends of the burners, said partition having perforations through which the respective burners project, said perforations being larger than the burners to permit the upward passage of air therethrough immediately surrounding the respective burners, said partition otherwise being substantially impervious to air, and adjustable means whereby the size of the respective openings may be varied.

7. In apparatus for producing carbon black by the impingement process comprising an enclosed chamber having an air-inlet at its lower end, an outlet for gaseous products at its upper end and enclosing, in a zone thereof intermediate said inlet and outlet, a plurality of spaced gas burner tips connected with a fuel gas supply line, a substantially imperforate shield having straight substantially vertical side walls extending around and substantially above and below each burner tip, said shields being so constructed and arranged as to prevent air being laterally directed into the flames and to cause laminar flow in the flame zone and between the flame and walls of the shields and a member arranged at such height above the tips as to present a cooling surface against which the flame may impinge, the improvement which comprises substantially impervious partitioning means extending laterally between said shields and adapted to prevent the upward passage of air through the spaces intermediate the respective shields.

8. In apparatus for producing carbon black by the impingement process comprising an enclosed chamber having an air-inlet at its lower end, an outlet for gaseous products at its upper end and enclosing, in a zone thereof intermediate said inlet and outlet, a plurality of spaced gas burner tips connected with a fuel gas supply line, substantially imperforate shields having straight substantially vertical side walls extending along at least two opposite sides of and substantially above and below the burner tips, said shields being so constructed and arranged as to prevent air being laterally directed into the flames and to cause laminar flow in the flame zone and between the flame and walls of the shields and a member arranged at such height above the tips as to present a cooling surface against which the flame may impinge, the improvement which comprises substantially impervious partitioning means extending laterally between said shields and adapted to prevent the upward passage of air through the spaces intermediate the respective shields.

9. In apparatus for producing carbon black by the impingement process comprising an enclosed chamber having an air-inlet at its lower end, an outlet for gaseous products of combustion at its upper end and enclosing, in a zone thereof intermediate said inlet and outlet, a plurality of gas burners and a relatively flat metallic surface so positioned above the burners as to constitute a carbon-collecting surface against which flames from the burners impinge, the improvement which comprises the arrangement of the burners in a plurality of parallel rows, refractory baffles extending along each of two opposite sides of the respective rows of burners and openings immediately adjacent to the burners, between the refractory baffles, adapted to permit the upward passage of air to the burners, the baffles being so constructed and arranged as to prevent the upward passage of air between the parallel rows of burners except through said spaces adjacent to the burners.

10. In apparatus for producing carbon black by the impingement process comprising an enclosed chamber having an air-inlet at its lower end, an outlet for gaseous products of combustion at its upper end and enclosing, in a zone thereof intermediate said inlet and outlet, a plurality of spaced gas burners and a relatively flat metallic surface so positioned above the burners as to constitute a carbon-collecting surface against which flames from the burners impinge, the improvement which comprises a heat exchanger positioned in the upper part of the chamber above the collecting surface, connections for passing air to the heat exchanger and from the heat exchanger to the air-inlet at the lower end of the chamber, and lateral partitioning means between the respective burners, said partitioning means forming restricted passages immediately surrounding the respective burners and preventing the upward passage of air between the respective burners except through said passages.

ELIZABETH JANE REARDON,
*Executrix of the Estate of William E. Reardon, Deceased.*

REFERENCES CITED

The following references are of record in the file of this patent:

UNITED STATES PATENTS

| Number | Name | Date |
| --- | --- | --- |
| 205,955 | Hallock | July 16, 1878 |
| 269,378 | Blood | Dec. 19, 1882 |
| 654,171 | Mann | July 14, 1900 |
| 706,429 | Mann | Aug. 5, 1902 |
| 706,430 | Mann | Aug. 5, 1902 |
| 1,891,202 | Lewis | Dec. 13, 1932 |
| 1,902,797 | Burke | Mar. 21, 1933 |
| 2,114,738 | Heller | Apr. 19, 1938 |
| 2,163,630 | Reed | June 27, 1939 |
| 2,399,591 | Amon | Apr. 30, 1946 |